Dec. 5, 1961 B. WALKER ET AL 3,011,574
FLUID SUPPLY MEANS FOR OPERATING AUTOMOBILE DEVICES
Filed March 3, 1958 3 Sheets-Sheet 1

INVENTORS
Brooks Walker,
Henry J. Schultz.
BY
Harness, Dickey & Pierce
ATTORNEYS.

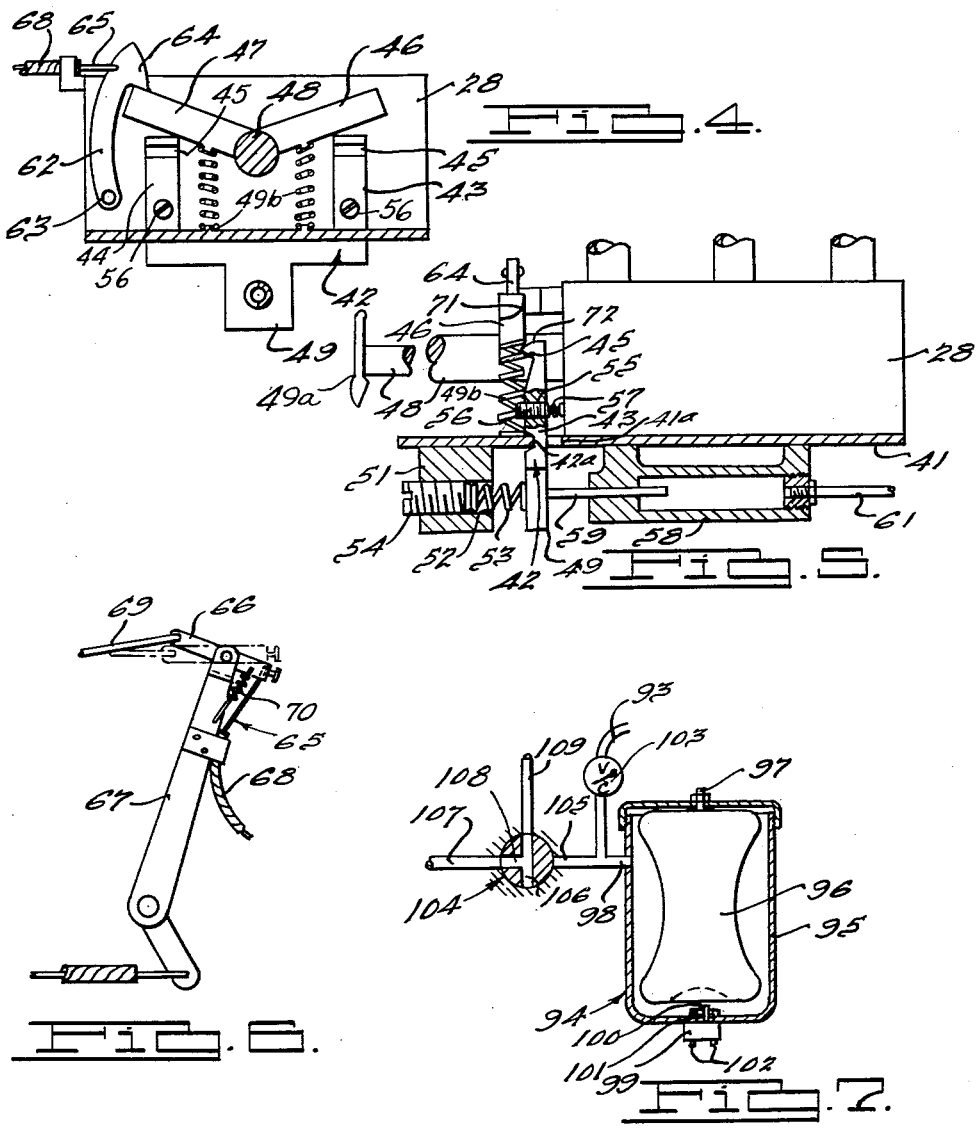

Dec. 5, 1961  B. WALKER ET AL  3,011,574
FLUID SUPPLY MEANS FOR OPERATING AUTOMOBILE DEVICES
Filed March 3, 1958  3 Sheets-Sheet 3
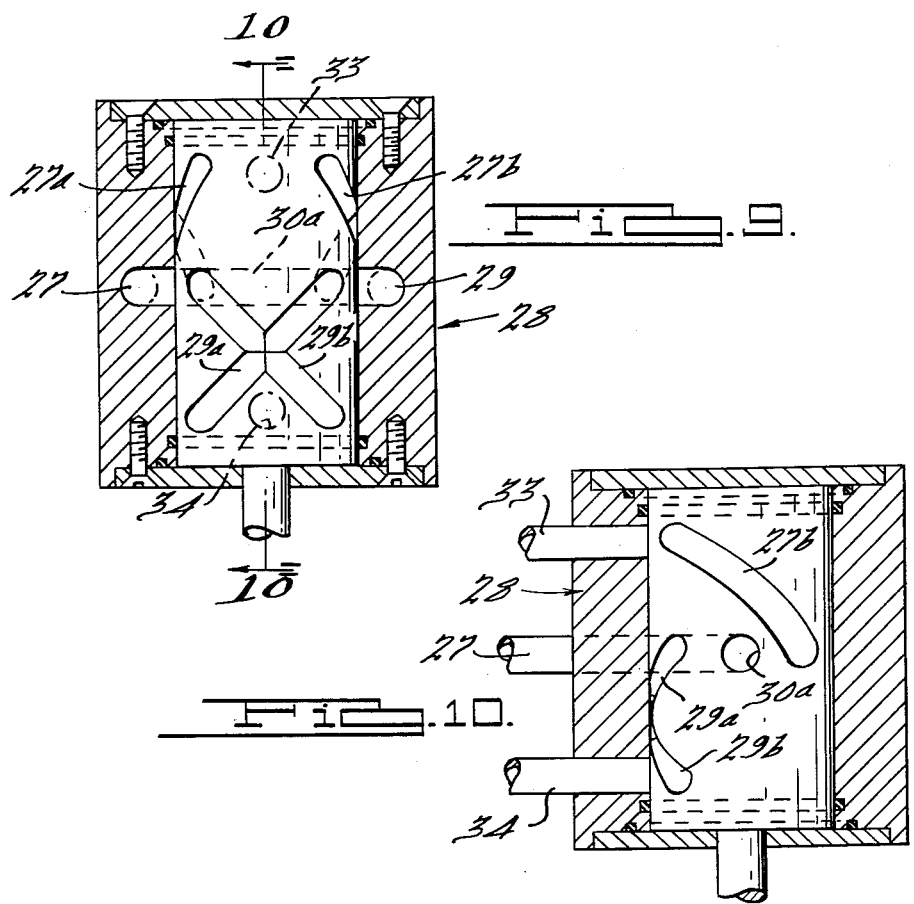
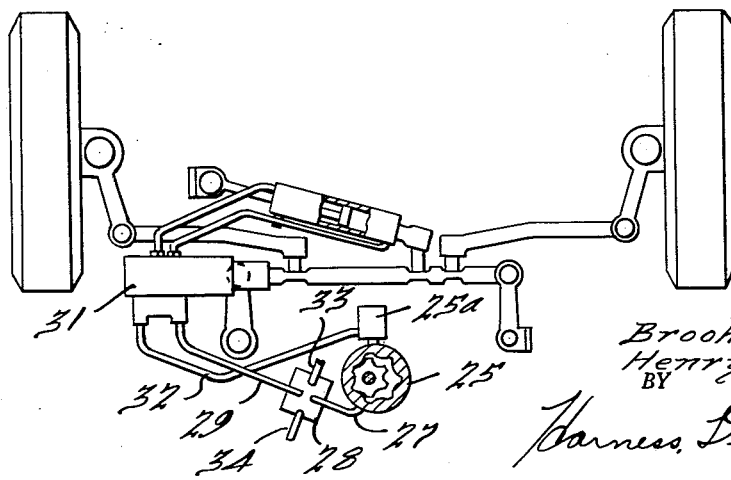
INVENTORS.
Brooks Walker
Henry J. Schultz
BY
Harness, Dickey & Pierce
ATTORNEYS United States Patent Office 3,011,574
Patented Dec. 5, 1961

3,011,574
FLUID SUPPLY MEANS FOR OPERATING
AUTOMOBILE DEVICES
Brooks Walker, 155 Montgomery St., San Francisco,
Calif., and Henry J. Schultz, San Francisco, Calif.; said
Schultz assignor to said Walker
Filed Mar. 3, 1958, Ser. No. 718,915
4 Claims. (Cl. 180—1)

This invention relates to fluid supply means for operating devices of automobiles, and particularly to the use of fluid from a pump for actuating the power steering, the window mechanism, the top mechanism, the jack mechanism, as well as mechanism for lowering a spare wheel or other mechanism to raise a car, and is a continuation in part of Serial No. 343,110, filed March 18, 1953, now abandoned.

The present invention pertains to the use of power from a pump which is preferably that which is employed for actuating the power steering mechanism of an automotive vehicle and for making the fluid pump pressure available for operating other devices of the automobiles. The pressure from the power steering pump is normally supplied at a few hundred pounds pressure, but when the wheels are cramped, a maximum pressure of 900 pounds may be delivered for a short period of time. When a mechanism is employed for supporting the spare wheel, or other mechanism, of an automobile in such manner that it may be lowered to the ground for raising the rear portion of the automobile, the power steering mechanism may not be employed, as the automobile is standing still; however, the power steering is effective, if necessary, as the pump discharge still passes through the power steering mechanism. All of the fluid from the discharge conduit of the pump of the power steering mechanism may be utilized for operating the piston in the cylinder of the mechanism for raising the automobile, but the fluid displaced from the other side of the double acting cylinder that operates the spare wheel lifting mechanism still passes through the power steering and makes said power steering effective. Some of the fluid may also be employed for operating a piston in a cylinder for simultaneously actuating a clutch mechanism or for shifting a gear into mesh with a driving gear, to thereby have the engine of the automobile drive the spare wheel in one direction when the forward speed gears are connected to the drive shaft, or in the opposite direction when the reversing gears are connected to the shaft. The fluid from the pump may also be employed to raise and lower windows, raise and lower the top of a convertible body, to operate a locking hook for supporting the rear axle from the body or frame when the automobile is raised or locking the front axle to prevent sway when operated on the spare wheel, as shown in United States Patents to Brooks Walker, No. 2,136,570; No. 2,005,173; No. 1,990,150; No. 1,884,933; No. 1,884,932; and No. 1,742,566.

While it is possible to directly employ the fluid from the delivery side of the power steering before it reaches the reservoir, a bleed line is preferably connected thereto which leads to a power accumulator having storage means for pressure up to a predetermined amount, approximately 200 to 500 p.s.i., with sufficient capacity in stored fluid so that it will be available at any time for operating one or more of the devices for a limited number of operations. The accumulator and accessories are so constructed that when pressure on the fluid accumulated therein has been lowered to a predetermined amount, the fluid from the return line of the power mechanism will be directed thereinto when the pump is running or interrupted by a valve to cause some of the fluid flowing from and to the pump to charge the accumulator to again bring up the pressure on the accumulated fluid to the desired amount while still keeping the power steering operative as the pump pressure available considerably exceeds the pressure of the accumulator in the ratio of say 900 p.s.i. to 300 p.s.i. Thereafter the delivered fluid will be retained in the accumulator until useful work is performed thereby while the fluid passing through the return line will be delivered to tank. The accumulator may be connected between the pump and the power steering or between the power steering mechanism and the reservoir.

Accordingly, the main objects of the invention are to provide a pump operating from an engine of a motor vehicle for supplying fluid for actuating the power steering mechanism, the windows, top, and other devices of the vehicle; to provide a connection in the delivery circuit from the pump of a steering mechanism which is connected to a cylinder for lowering a spare wheel, or other mechanism, to the ground for raising the rear of an automobile and for operating a mechanism which effects a driving connection between the wheel to the automobile engine; to provide an accumulator in the fluid circuit of the pump of a power steering mechanism for storing fluid at a predetermined pressure without interference with the operation of the power steering mechanism, which fluid is always available for operating various devices provided on the automobile; and, in general, to provide a system for operating devices on automobiles by maximum fluid pressure which is generally available for power steering, for vehicle raising, or operating other devices and which is simple in construction, positive in operation, and economical of manufacture.

Other objects and features of novelty of the invention will be specifically pointed out or will become apparent when referring, for a better understanding of the invention, to the following drescription, taken in conjunction with the accompanying drawings, wherein:

FIG. 4 is a sectional view of the structure illustrated in FIG. 2, taken on the line 4—4 thereof;

FIG. 5 is a side view in elevation of the structure illustrated in FIG. 4;

FIG. 6 illustrates a brake lever which actuates a wire connected to the structure illustrated in FIG. 4;

FIG. 7 is a view of an accumulator which may be employed in the system illustrated in FIG. 2;

FIG. 8 is a view of panels which control the admission of fluid to the various devices on the vehicle;

FIG. 9 is a sectional view of the valve illustrated in FIG. 4;

FIG. 10 is a sectional view of the valve illustrated in FIG. 9, taken on the line 10—10 thereof, and FIG. 11 is a plan view of a power steering mechanism shown in neutral position, with the fluid from the pump being by-passed through the mechanism back to tank.

Figures 1, 2, 3:
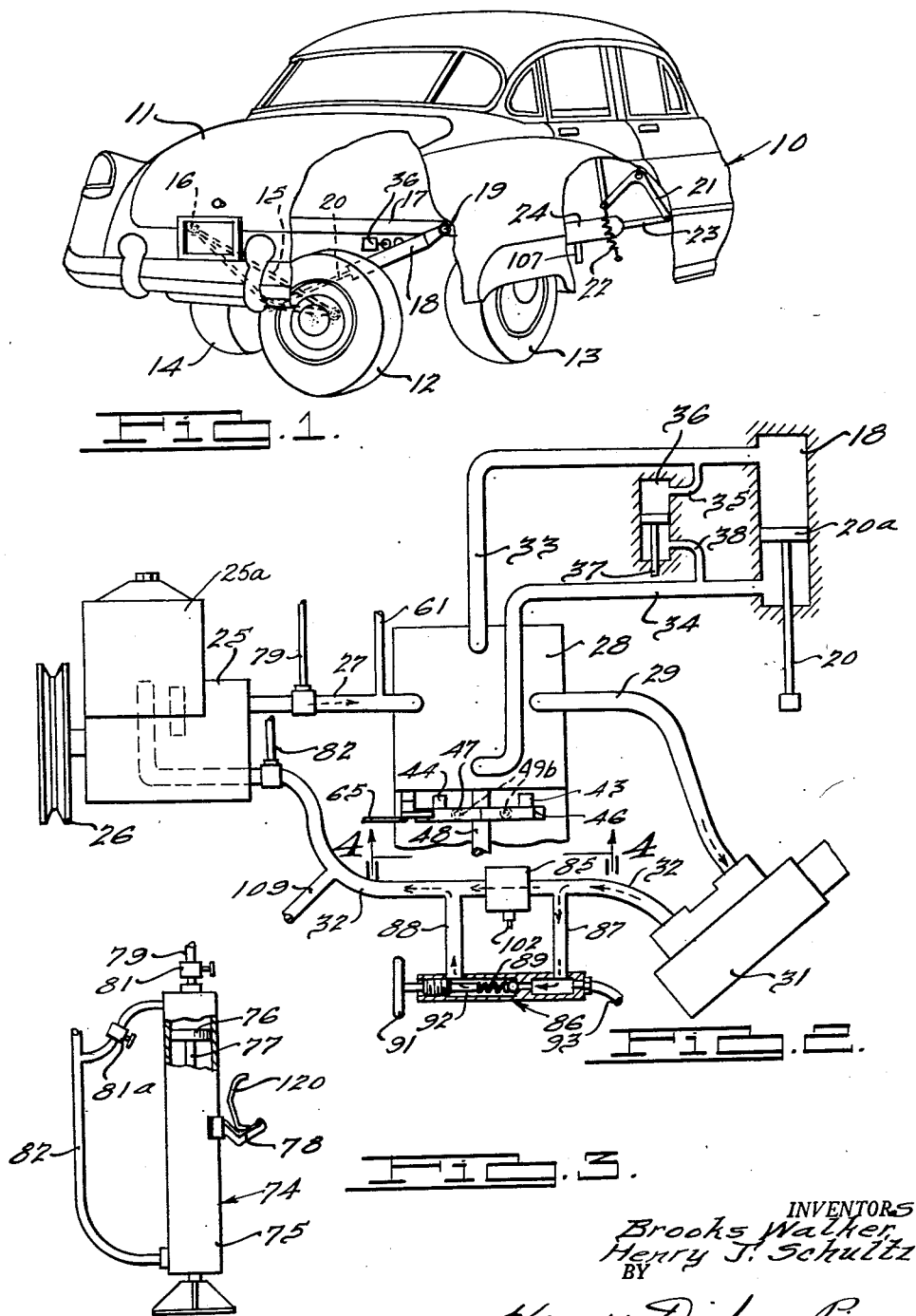
FIGURE 1 is a broken perspective view of an automobile having devices thereon operated by the fluid system of the present invention.
FIG. 2 is a schematic view showing the pump and fluid system for operating various devices of the automobile.
FIG. 3 is a view of a fluid jack which may be connected into the system illustrated in FIG. 2.

In FIGS. 1 and 2, an automobile 10 of the passenger type is herein illustrated, having portions of the body 11 broken away to show cylinder operated devices provided therein. In the rear portion of the body, the spare wheel 12 is illustrated as resting upon the ground, with the rear wheels 13 and 14 raised therefrom. A supporting mechanism 15 for the wheel is secured by a pivot 16 to the frame 17 with its lower end connected to a rod 20 of a cylinder 18 which is secured by a pivot 19 to the frame 17, as is shown in FIG. 5 of United States Patent to Brooks Walker, No. 2,005,173. Similarly, a window raising mechanism 21, which may be mounted in the rear side quarter portion of the body or in the door, is actuated by a piston rod 23 from a cylinder 24. It is to be understood that a similar mechanism, operated by a piston rod from a cylinder, is employed for actuating the raising and lowering mechanism for a top of the convertible type of body.

The engine compartment of the automobile has a fluid pump 25 mounted thereon, provided with a pulley 26 driven by a belt from a pulley on the engine so that fluid under pressure is being delivered at all times during the operation of the engine from the delivery conduit. This pump 25 and reservoir 25a are similar to the Vickers and Eaton pump, reservoir and flow control valve unit generally used on certain cars on the market today which are equipped with power steering. From the delivery conduit 27 fluid passes through a valve 28 and conduit 29, from which it is connected to the power steering control mechanism 31 of the vehicle. The power steering control mechanism directs fluid to one or the other side of a piston in a cylinder to turn the wheels to the right or left conforming to the direction indicated by the turning of the steering wheel, as will be evident to one skilled in the art upon viewing the structure of FIG. 11. A conduit 32 extends from the power steering control mechanism back to the reservoir 25a associated with the pump 25. The valve 28 is so constructed as to have a power delivery circuit 33 extending therefrom to one end of the cylinder 18 and a return conduit 34 extending from the opposite end of the cylinder 18 back to the valve which is connected to the conduit 29 through the passageway 29a when the conduit 27 is connected by a passageway 27a to the conduit 33 upon the operation of the valve clockwise from its neutral position. Valve 28 closes off openings to conduits 33 and 34 when conduits 27 and 29 are connected to each other through a passageway 30a without substantial restriction. When valve 28 is moved clockwise into vehicle raising position, fluid is delivered to the upper end of the cylinder 18, the rod 20 is moved outwardly and thereby rotates supporting mechanism 15 downwardly to thereby move the spare wheel into engagement with the ground, the continued movement thereafter raising the wheels 13 and 14 of the vehicle from the ground. Simultaneously, the supply of fluid into the conduit 33 directs fluid through the conduit 35 to the end of a cylinder 36 for extending a rod 37 therefrom for shifting a mechanism for producing a driving engagement between a driven element of the vehicle to the wheel 12 so that the wheel may be driven to the right or left by the reverse and forward control thereof, to thereby swing the rear end of the vehicle around the front wheels thereof in either direction as may be desired. A conduit 38 is connected to the forward end of the cylinder 36 and to the conduit 34. Upon the reversal of fluid flow in the conduits 33 and, by the operation of valve 28 counterclockwise to its other position beyond neutral for retracting the spare tire or ground engaging element, a passageway 27b joins conduits 33 and 29 and a passageway 29b connects conduits 27 and 34. The rod of the cylinder 18 and rod 37 of the cylinder 36 are retracted to their initial positions, thereby raising the wheel 12 and lowering the rear wheels 13 and 14 into engagement with the ground and disconnecting the driving mechanism from the wheel 12. This raising of the rear end of the vehicle on the wheel 12 usually occurs when the car is not being steered so that all of the fluid delivered by the pump 25 is available for raising the vehicle; however, the discharge from the other side of cylinders 18 and 36 flows through the power steering mechanism so as to maintain it operating if needed. By this means only the two connections from the pump outlet and inlet are used and no extra connection to the reservoir is necessary so that the installation is simple and economical.

The valve 28, as illustrated in FIGS. 4 and 5, is mounted on a base plate 41 on which a control plate 42 is pivoted. The control plate has a pair of arms 43 and 44 extending upwardly therefrom having detents 45 on the upper ends of each which are engaged by angularly disposed bars 46 and 47 which are fixed to the rotatable valve shaft 48. A boss 51 extending downwardly from base plate 41 is secured thereto. An aperture 52 in the boss 51 receives one end of a spring 53, the opposite end of which engages the tab 49 on control plate 42. A setscrew 54 in the aperture 52 provides a predetermined adjustable stress to the spring 53 to urge it to rotate control plate 42 counterclockwise. The upwardly projecting arms 43 and 44 have apertures 55 therein containing a setscrew 56 which engages a spring 57 disposed between the valve and the arms, providing a predetermined tension to also rotate the plate 42 in a counterclockwise direction and to hold control plate notch 42a firmly in slot 41a. A cylinder 58 is mounted on the lower face of the plate 41, having a piston rod 59 extending therefrom in engagement with the rear face of the tab 49 of the plate 42 in a position to rotate the plate 42 in a clockwise direction when urged by fluid pressure delivered within the cylinder. A conduit 61 extends from the opposite end of the cylinder from that containing the rod 59 and is connected to the delivery conduit 27 from the pump. When normal pressure is applied to the cylinder 58, the springs 53 and 57 provide sufficient tension to urge the plate 42 in a counterclockwise direction to engage and retain one or the other arms 46 and 47 in latched position, to thereby retain the valve 28 in shifted position from neutral for vehicle raising or vehicle lowering operations.

It will be noted that a positively holding latch 62 is secured by a pivot 63 to the front face of the valve 28 having a detent 64 which projects over the end of the bar 47 for the purpose of preventing the shaft from being rotated in a clockwise direction. A wire 65 is connected to the upper end of the latch 62, the opposite end of which is connected to an arm 66 pivoted on the end of the brake lever 67. The wire is preferably enclosed within a casing 68 so that it may be moved longitudinally around bends, etc., without buckling. The arm 66 is connected by a rod 69 to the brake lever of the car so that when a braking force is applied to the lever 67 by the rod 69, the arm 66 will move in a counterclockwise direction to thereby pull the wire 65 and release the detent 64 from the end of the bar 47. The spring 70 connected between the arm 66 and lever 67 moves the arm 66 in a clockwise direction for reversing the movement of the wire 65 to move the detent of the latch 62 in position to engage the bar 47. The brake lever is released by the operator when the car is to be moved to the right or left after the car has been raised by the action of the pump and cylinder 18 through fluid contained by valve 28. When the car is fully raised and piston 20a has reached the end of the stroke, the pressure in pump delivery conduit 27 raises above that required to lift the car but below the relief pressure control valve in the pump, and this higher pressure causes the piston rod 59 to overcome the tension of springs 53 and 57 to disconnect detent 45 of arm 43 from valve arm 46 so that valve 28 can return to neutral by the action of the springs 49b, as shown in FIG. 4, to pass oil from conduit 27 directly to 29 and close off lines 33 and 34 to hold the vehicle in raised position.

When the valve shaft 48 has been turned in a clockwise direction to direct fluid from the pump into the spare wheel lowering mechanism, the bar 46 moves beneath the detent 45 through the action of the cam surfaces 71 and 72 and is retained in latched position by the springs 53 and 57. This provides a positive holding force for retaining the valve in spare wheel lowering position, and when it is desired to raise the wheel at any time in the lowering cycle it is done by moving the valve to and beyond neutral position, as illustrated in FIG. 4, in a clockwise direction until arm 47 is engaged by detent 45 of arm 44. In this position of valve 28 pump discharge line 27 is connected to line 34 and line 33 is connected to line 29 to raise the spare tire.

When the valve is in neutral position, as illustrated in FIG. 4, the pressure fluid delivered through the conduit 27 passes through the valve into the conduit 29 and flows in a normal manner through the power steering control mechanism 31 from which it passes through the conductor 32 back to the reservoir 25a. When it is desired to operate the rear end of the car on the spare wheel 12, the automobile is stopped, the brake handle is moved to "on" position, thereby rocking the arm 66 counterclockwise to pull the wire 65 and rotate the latch 62 in a counterclockwise direction, thereby releasing the rod 47. This is a safety feature which prevents the inadvertent operation of the valve 28 to spare tire lowering position while the car is moving. After holding latch 62 is unlocked so that valve shaft 48, which extends to the driver's compartment may be rotated by handle 49a to rotate arm 46 of valve 28 detent 45 of arm 43 holds valve 28 in the vehicle raising position by connecting line 27 to line 33 and line 34 to line 29. This causes the passage of fluid from the conduit 27 through the valve to the conduit 33 which operates the piston rod in the cylinder 18 to lower the supporting mechanism for the spare wheel 12 which, upon engaging the ground, causes the rear end of the automobile to be raised, thereby raising the wheels 13 and 14. To limit the degree of movement required for raising the wheels 13 and 14, a latching hook is provided which engages the rear axle so as to carry it directly on the body rather than through the springs so that the axle and wheels will be raised as a direct unit with the body. Such a latching hook may be operated by a piston rod and cylinder which are similar to the piston rod 37 and cylinder 36 illustrated in FIG. 2. The fluid directed into the cylinder 36, as pointed out above, operates a clutch or other means for connecting the drive from the engine to the spare wheel. Fluid within the cylinder 18 passes out through the conduit 34 through the valve 28 into the conduit 29 through the power steering control mechanism 31 and conduit 32, back to tank.

Valve 28 can be moved into the spare tire raising position at any time whether the brake is on or not as latch 62 does not prevent valve arm 47 from rotating counterclockwise to be engaged by detent 45 of arm 44 in this position. Line 27 is connected to line 34 and line 33 is connected to line 29 to cause the spare tire to be raised. When the piston 20a reaches the end of its travel, the pressure is used to force the piston rod 59 to rock plate 42 to the unlatched position so that valve 28 may return to neutral position, as shown in FIG. 4, and lines 33 and 34 are closed off to hold the spare wheel up and lines 27 and 29 are connected in the fluid circuit. The fluid is also reversed in the cylinder 36, thereby disconnecting the drive from the spare wheel 12, and if an additional cylinder 36 is employed for swinging the latching hook for the axle, the piston in this cylinder is also retracted, moving the latch from a position of engagement with the axle. The fluid in the upper part of the cylinder 18 passes out through the conduit 33, through the valve 28, conduit 29, power steering control mechanism 31, and conduit 32, to reservoir 25a.

It will be noted that during the raising and lowering of the spare wheel, the automobile is in standing position, so that the power steering mechanism is usually not employed and the use of the fluid from the pump by the spare wheel lowering mechanism does in no way detract from the value of power steering mechanism, as the discharge from the opposite sides of cylinders 18 and 36 passes through the power steering mechanism.

After the spare wheel has been fully retracted, the detent 45 of rod 44 releases the rod 47 by the excess pressure acting on rod 59 and shaft 48 is rotated clockwise to neutral position, as illustrated in FIG. 4, by one of the springs 49b. When the brake is released, the detent 64 of the latch 62 is moved to a position of engagement with the end of the bar 47, thereby preventing the valve from being moved to a position for lowering the spare wheel 12, thereby providing assurance against the lowering of the wheel during the time the brake is not set. In this position, as pointed out above, the fluid from the conduit 27 passes from the valve directly into the conduit 29 leading to the power steering mechanism. Valve 28 is what is generally known as a four-way open center valve but certain other types of valves could be used. Valve 28 could be located in line 32 using the fluid under pressure after it had left the power steering control mechanism 31, in which case line 32 would be connected where line 27 is now connected to the valve as the pressure inlet connection and line 27 would be directly connected to line 29. The outlet shown connected to line 29 would be connected to 32 where it leads to line 87 to charge the accumulator.

An arrangement is herein illustrated for operating a fluid actuated jack 74 illustrated in FIG. 3. The jack has a cylinder 75 containing a piston 76 mounted on a rod 77. The cylinder has an arm 78 of desired contour attached thereto for engaging a part of an automobile, such as the bumper 126 in a manner to prevent the arm from slipping therefrom. The upper part of the cylinder 75 has a flexible conduit 79 connected thereto which is joined to the pressure delivering conduit 27 of the pump. The jack 75 has a manual unseating check valve 81 and shut off valve which, when unseated, permits the flow of fluid from the upper end of the cylinder 75 back into line 79 and through power steering mechanism when the engine is off or the power steering is in neutral, thereby lowering the cylinder on the piston 76 and rod 77 for lowering the jack and automobile.

To raise the jack, cramp the power steering to full wheel turned position and the hydraulic pressure will raise to the relief limit of around 900 p.s.i. which is available to operate the jack by turning valve 81 to on and check position. The closing of the solenoid valve 85 will also develop slightly less than maximum pressure from the pump 25 to operate the pack 74. When raised, the engine can be shut off and the check will hold. The jack could be connected to the accumulator for operation without engine operation, in which case lowering would be accomplished by closing off valve 81 and opening valve 81a which connects the upper and lower ends of cylinder 75 to control the lowering. When not in operation, valve 81a is always left tightly closed. To take care of any leakage past the piston 76, the lower end of the cylinder has a conduit 82 which is connected into the return conduit 32 into which the fluid will flow when the valve 81 is closed and the valve 81a is open. The jack may be retained connected to the flexible conduits at all times and stored in a container provided within the engine compartment.

The fluid from the pump 25 is also useful for operating pistons in cylinders of additional hydraulically actuated devices of the vehicle. These may be the cylinders which operate the windows to closed position or to open and closed positions, the cylinder for operating the foldable top of a convertible body, the seat adjusting mechanism and the like. One method of making available such fluid is illustrated in FIG. 2, wherein the return conduit 32 has a solenoid operated valve 85 therein which cuts off the flow of fluid to tank. In this arrangement, a by-pass pressure regulating valve 86 is connected in a by-pass circuit around the valve 85 in the conduit 32 which includes the conduits 87 and 88. The fluid from the power steering control mechanism 31 passes from the conduit 32 when the valve 85 is closed, through the conduit 87 and, when a sufficient pressure has been built up, past the valve 86, through the conduit 88, back into the conduit 32 from which it is directed to tank. The valve 86 is retained in seating position by a spring 89, the tension of which may be adjusted by the hand wheel 91 which advances and retracts a stem 92 which is in engagement with the spring 89. In this manner, the maximum pressure which is delivered from the conduit 87 into a conduit 93 of the valve 86 may be regulated to be a predetermined amount at all times. The fluid from the conduit 93 may then be delivered to suitable control valves for operating pistons in cylinders of hydraulically actuated devices, in a manner referred to hereinafter.

Referring to FIG. 7, a still further form of the invention is illustrated, that wherein an accumulator 94 may be connected to the conduit 93 in a manner to provide a reserve supply of fluid, so that when the fluid is employed while the automobile is being driven, pressure will still be available to operate the power steering mechanism. Fluid pressure is thus available for limited operation of equipment whether the engine is operating or not. Also, the volume of fluid under pressure from an accumulator can far exceed the pump capacity in a given short amount of time so that windows, tops, seats, etc., can be adjusted much more quickly than when supplied by the pump alone. In this connection, it will be noted that the convertible top of the automobile is generally raised and lowered only when the automobile is in standing position, so that generally when this operation is being accomplished the fluid is not required by the power steering mechanism; however, if the car is moving while the top is being operated the power steering is still operative. The raising and lowering of the windows and the adjusting of the seat is undertaken at the time the automobile is being driven, and also when the engine is not running—as when passengers are in the car while it is parked and it begins to rain, etc.—so that the accumulator is of importance at this time. The accumulator herein illustrated embodies a sealed chamber 95, having therein a flexible bellows or bag 96, from which a stem 97 extends to project through the chamber 95 in sealed relation thereto. This stem projects from the casing a sufficient amount so that it may be filled with air in the same manner as a tire valve from an air gas or nitrogen pressure source of sufficient pressure, say 200 to 400 p.s.i. With this arrangement, a predetermined pressure of gas may be provided within the bag 96, as is common with accumulators in hydraulic systems.

Fluid delivered from the conduit 93 passes through a branch 98 connected through the wall of the chamber 95 to permit the fluid to enter thereinto and, by compressing the bag, provide a reservoir of fluid under predetermined pressure which is available for actuating the pistons in cylinders already charged with fluid whether the pump 25 is operating or not and also the accumulator is capable of delivering a larger volume of pressure fluid per time unit than is common with said pump 25 and without affecting the supply being delivered from the pump to operate the power steering. A pressure sensitive switch 99 has a stem 100 extending within the chamber 95 and sealed thereto by an O-ring 101. A circuit 102 from the switch 99 is connected to the solenoid operated valve 85 through a suitable power source. When the pressure is lowered the stem 100 moves inwardly of the chamber and the circuit is completed through the conductors 102, to thereby actuate the valve 85 and cause the fluid normally delivered to tank through the conduit 32 to pass through the conduits 87 and 93 to thereby charge the accumulator 94. When the pressure in the accumulator has reached a predetermined amount, the stem is depressed thereby and the circuit through the conductors 102 is opened returning the valve 85 to its initial position, permitting the flow of fluid directly through the return conduit 32 to tank. As pointed out hereinabove, the accumulator provides a substantial amount of fluid at high pressure at all times available for actuating pistons in cylinders of hydraulically actuated devices without interfering with the fluid flow through the power steering mechanism or other devices, and also providing a certain amount of fluid under pressure when pump 25 is not operating as when the vehicle is standing. A check valve 103 is provided in the conduit 93 to prevent the backflow of fluid after the fluid pressure has been built up within the accumulator as would be possible when pump 25 stops.

A solenoid actuated valve 104 is connected to a branch 105 from the accumulator and the conduit 93 which, in the position illustrated, is in "off" position, preventing the delivery of fluid to cylinders of hydraulically actuated devices, such as window lifts, convertible top operating devices, and the like. When the valve is rotated, fluid is delivered through a passageway 106 to a conduit 107 which is connected to the cylinder of the hydraulically actuated device for delivering fluid to the cylinder. For example, the conduit 107 can be connected to the cylinder 24 of the hydraulic window actuating device as illustrated in FIG. 1. When the valve is in the position illustrated, the conduit 107 is connected through a passage 108 of the valve to the passageway 106 and to a conduit 109 which is connected to the conduit 32 so that the fluid may be returned to tank after the cylinder has been actuated, as by spring 22 acting on window lift cylinder 24 through crank 21. In this arrangement, it is contemplated that spring means is employed for returning the piston to its initial position within the cylinder. When a double acting cylinder is employed, then a valve 104 is utilized which connects the pressure from the conduit 105 to either end of the cylinder when connecting the opposite end to the conduit 109 to tank. When it is desired to hold a cylinder in a given position, valve 104 is turned to close off accumulator line 105 and cylinder control line 107. In such a position window control cylinder 24 will be held in a fixed position.

In FIG. 8, a switch panel 111 is illustrated, having a plurality of switches 112 thereon, one for controlling each of the windows which are operated to closed and open position by one of a number of pistons and cylinders, one connected to each window respectively. The panel 111 is mounted on the door adjacent to the driver so that he may control any one of the valves 104 for producing the operation of the window which is to be actuated to closed or open positions. A switch panel 113 is also illustrated which may be mounted on the instrument panel, having a switch 114 thereon which actuates a valve 104 for producing a flow of fluid to a cylinder of a convertible top for producing the raising and lowering thereof. A panel 115 is illustrated which may be mounted on the side of the seat, having a switch 116 thereon for operating the valve 104 which directs fluid to a cylinder for actuating hydraulically operated seat mechanism for raising, lowering, tilting, advancing and retracting the seat to any desired position.

A source of power is provided by the mechanism hereinabove described and illustrated which is always available for operating the power steering mechanism when the pump is running and various other hydraulically actuated devices of the automobile whether the pump is operating or not. The spare wheel or ground engaging and car raising device, the window closing and opening devices, the convertible top raising and lowering devices, the seat adjusting device, and any other devices which are provided on the automobile which are hydraulically actuated may be operated by this construction while the engine driven pump is providing fluid in the same general circuit for power steering control. An accumulator may be employed in the system for storing a predetermined amount of fluid under pressure so that when the pump is not operating other mechanisms, the fluid under pressure in the accumulator will be available for operating the jack, the windows, the seat and the like within the pressure storing capacity of the accumulator. The accumulator and this circuit is so constructed that when a predetermined amount of fluid has been used up, the system will automatically supply additional fluid to charge the accumulator when the pump is running and still provide power steering control as all discharge from the pump 25 passes through power steering control mechanism 31 before going to charge accumulator 94. Relief valve 86 is generally set below the pressure in the pump relief valve. For example, valve 86 may be set for 200 to 400 p.s.i. while pump relief valve may be set for 900 p.s.i. Therefore, a flow through power steering is always assured when pump 25 is operating whether accumulator 25 is newly charged or not. Thus, from a single source of fluid supply, the flow of the fluid under pressure is made available for operating any of the hydraulic devices employed on the automobile, and a second electrically driven pump is not necessary to operate windows, tops, radio antennae, etc., as is common practice in automobile construction today. Considerable weight and cost are saved and also the electrical load on the battery is reduced by this construction.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. In a fluid system for operating hydraulically actuated devices of an automotive vehicle, a pump, means on said pump by which it is driven, a tank of fluid connected to said pump, a pressure conduit operatively connected to said pump, a power steering control mechanism connected to said pressure conduit, a return conduit from said power steering control mechanism connected to said tank, a valve in said return conduit, a by-pass circuit connected in parallel with said valve, pressure regulating means connected to said by-pass circuit, and an accumulator connected to said by-pass circuit on the input side of said pressure regulating means.

2. The invention as defined in claim 1 including means operatively connected between said accumulator and said valve to actuate the valve when the pressure in said accumulator exceeds a predetermined value.

3. In an auxiliary fluid system for operating devices of an automotive vehicle having a brake mechanism, including a pump, a tank of fluid connected to said pump, a pressure conduit from said pump, a valve connected to said pressure conduit, a power steering control mechanism connected to said valve, a return conduit from said power steering control mechanism to said tank, a cylinder containing a piston connected to said valve, said valve being movable to at least a first position wherein the piston is moved in one direction and a second position wherein the piston is moved in the opposite direction, and a lock-out means actuated when the brake mechanism is released for locking the valve against movement to said first position to prevent the movement of the piston in said one direction.

4. In a fluid system for an automobile having a brake mechanism, a power source, a piston movable within a cylinder to advanced and retracted positions, a valve movable from a neutral position to two additional positions for advancing and retracting the piston in the cylinder, a lock-out mechanism for said valve which prevents its actuation from the neutral position to one of said two additional positions while enabling the valve to be moved to the other of the two additional positions at all times, and means connected to the brake mechanism for releasing said lock-out mechanism when the brakes are set so that the valve can be moved to said one additional position.

References Cited in the file of this patent

UNITED STATES PATENTS

| | | |
|---|---|---|
| 2,363,179 | Harrington et al. | Nov. 21, 1944 |
| 2,403,325 | Armington | July 2, 1946 |
| 2,674,092 | Gardiner | Apr. 6, 1954 |